(12) United States Patent
Kei

(10) Patent No.: US 12,326,548 B2
(45) Date of Patent: *Jun. 10, 2025

(54) CONFOCAL SCANNER, CONFOCAL SCANNER SYSTEM, AND CONFOCAL MICROSCOPE SYSTEM

(71) Applicant: YOKOGAWA ELECTRIC CORPORATION, Musashino (JP)

(72) Inventor: Takayuki Kei, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 543 days.

This patent is subject to a terminal disclaimer.

(21) Appl. No.: 17/663,860

(22) Filed: May 18, 2022

(65) Prior Publication Data

US 2022/0390728 A1 Dec. 8, 2022

(30) Foreign Application Priority Data

Jun. 4, 2021 (JP) ................................ 2021-094657

(51) Int. Cl.
*G02B 21/00* (2006.01)

(52) U.S. Cl.
CPC ..... *G02B 21/0032* (2013.01); *G02B 21/0044* (2013.01); *G02B 21/0052* (2013.01)

(58) Field of Classification Search
None
See application file for complete search history.

(56) References Cited

U.S. PATENT DOCUMENTS

| 5,969,846 | A | * | 10/1999 | Kishi | ................. G02B 21/0064 |
| | | | | | 359/227 |
| 2015/0378141 | A1 | * | 12/2015 | Bathe | ................... G02B 21/025 |
| | | | | | 359/385 |
| 2022/0390729 | A1 | * | 12/2022 | Kei | ..................... G02B 21/0032 |

FOREIGN PATENT DOCUMENTS

JP  2011-085759 A  4/2011

* cited by examiner

*Primary Examiner* — Dung T Nguyen
(74) *Attorney, Agent, or Firm* — WHDA, LLP

(57) ABSTRACT

A confocal scanner (21) according to the present disclosure includes a first pinhole array disk (211a), a second pinhole array disk (211b), a condensing element array disk (212) located between the first pinhole array disk (211a) and the second pinhole array disk (211b), a connecting shaft (213) connecting the first pinhole array disk (211a), the second pinhole array disk (211b), and the condensing element array disk (212), and a motor (214) configured, together with the connecting shaft (213), to rotate the first pinhole array disk (211a), the second pinhole array disk (211b), and the condensing element array disk (212). The first pinhole array disk (211a) is located at a first focal plane, the second pinhole array disk (211b) is located at a second focal plane, and a diameter of first pinholes and a diameter of second pinholes are different from each other.

9 Claims, 5 Drawing Sheets

CONFOCAL SCANNER, CONFOCAL SCANNER SYSTEM, AND CONFOCAL MICROSCOPE SYSTEM

CROSS-REFERENCE TO RELATED APPLICATION

The present application claims priority to Japanese Patent Application No. 2021-094657 filed on Jun. 4, 2021, the entire contents of which are incorporated herein by reference.

TECHNICAL FIELD

The present disclosure relates to a confocal scanner, a confocal scanner system, and a confocal microscope system.

BACKGROUND

Technology related to a microlens Nipkow disk-type confocal scanner, which is used in confocal microscope systems, is known.

For example, Patent Literature (PTL) 1 discloses a confocal optical scanner capable of providing two types of disk units by alternately switching pinhole array disks, which have different pinhole diameters, between a position in the optical path of illumination light and a position removed from the optical path and combining each pinhole array disk with a microlens array disk. Such a confocal optical scanner achieves a microlens Nipkow disk-type confocal scanner with variable pinhole diameter. Therefore, by changing the pinhole diameter to match the magnification of the objective lens in a microscope, confocality can be maintained to acquire a detailed image.

CITATION LIST

Patent Literature

PTL 1: JP 2011-085759 A

SUMMARY

A confocal scanner according to an embodiment includes:
a first pinhole array disk in which a plurality of first pinholes is arranged in an array;
a second pinhole array disk in which a plurality of second pinholes is arranged in an array;
a condensing element array disk, on which a plurality of condensing elements is arranged in an array, located between the first pinhole array disk and the second pinhole array disk;
a connecting shaft connecting the first pinhole array disk, the second pinhole array disk, and the condensing element array disk; and
a motor configured, together with the connecting shaft, to rotate the first pinhole array disk, the second pinhole array disk, and the condensing element array disk, wherein
the first pinhole array disk is attached to the connecting shaft so that one first pinhole is positioned at a first focal plane of one condensing element in the condensing element array disk,
the second pinhole array disk is attached to the connecting shaft so that one second pinhole is positioned at a second focal plane of one condensing element in the condensing element array disk, and
a diameter of the first pinholes and a diameter of the second pinholes are different from each other.

DETAILED DESCRIPTION

Figure 1:
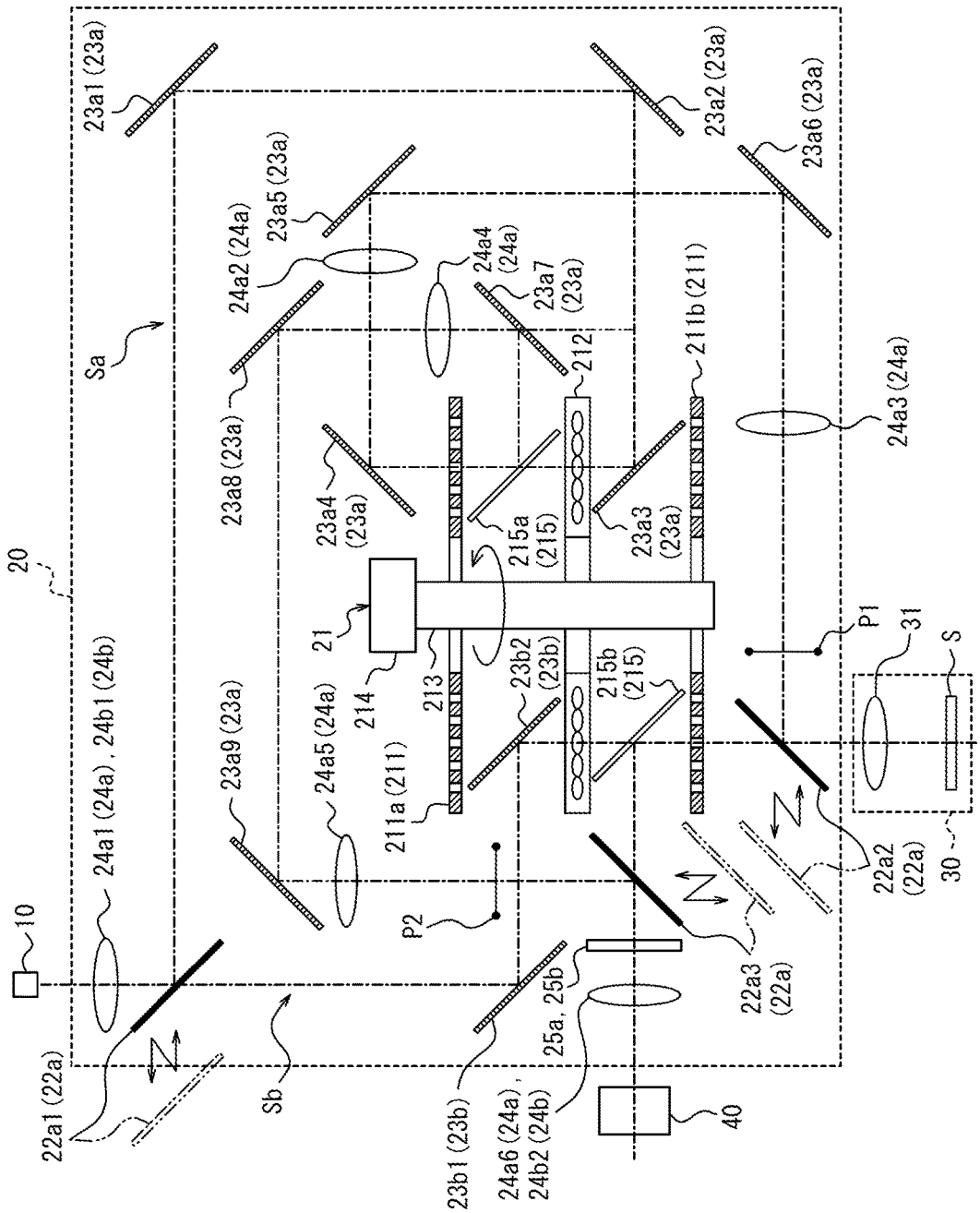
FIG. 1 is a schematic diagram illustrating an example configuration of a confocal microscope system according to an embodiment.

The above-mentioned conventional technology requires two types of disk units, which increases costs. The design of the moving mechanism is also complicated, since the disk unit that rotates at high speed is attached to the moving mechanism. Consequently, the number of precision parts increases, further increasing costs.

It would be helpful to provide a confocal scanner, a confocal scanner system, and a confocal microscope system that can change the pinhole diameter without requiring a complicated moving mechanism and at reduced cost.

A confocal scanner according to an embodiment includes:
a first pinhole array disk in which a plurality of first pinholes is arranged in an array;
a second pinhole array disk in which a plurality of second pinholes is arranged in an array;
a condensing element array disk, on which a plurality of condensing elements is arranged in an array, located between the first pinhole array disk and the second pinhole array disk;
a connecting shaft connecting the first pinhole array disk, the second pinhole array disk, and the condensing element array disk; and
a motor configured, together with the connecting shaft, to rotate the first pinhole array disk, the second pinhole array disk, and the condensing element array disk, wherein
the first pinhole array disk is attached to the connecting shaft so that one first pinhole is positioned at a first focal plane of one condensing element in the condensing element array disk,
the second pinhole array disk is attached to the connecting shaft so that one second pinhole is positioned at a second focal plane of one condensing element in the condensing element array disk, and
a diameter of the first pinholes and a diameter of the second pinholes are different from each other.

This enables the pinhole diameter to be changed without requiring a complicated moving mechanism and at reduced cost. For example, in the confocal scanner according to an embodiment, the pinhole diameter can be changed by a fixed set of disk units, without requiring a complicated moving mechanism for pinhole array disks such as those described in PTL 1. Without use of a complicated moving mechanism, the confocal scanner enables selection of either the first confocal scanner or the second confocal scanner, described below, in the confocal scanner, thereby achieving a low-cost apparatus even when using a technique to vary the pinhole diameter. According to one embodiment, the pinhole diameter of the confocal scanner can be made variable in a microlens Nipkow disk-type confocal laser microscope. By varying the pinhole diameter in this way, the same confocality can be achieved for both a low-magnification and a high-magnification objective lens in the microscope.

A confocal scanner according to an embodiment may further include a branching element disposed between the first pinhole array disk and the condensing element array disk and/or between the second pinhole array disk and the condensing element array disk. This configuration enables the confocal scanner to separate the optical path of the irradiation light coming from the light source and the optical path of the fluorescent light coming from the sample on the microscope. As a result of the confocal scanner including two branching elements, the same effect can be achieved for both the first confocal scanner and the second confocal scanner, described below.

In a confocal scanner according to an embodiment, the plurality of first pinholes may be arranged in the first pinhole array disk at equal pitch and in a spiral, and the plurality of second pinholes may be arranged in the second pinhole array disk at equal pitch and in a spiral. With this configuration, the confocal scanner can scan a sample on the microscope at high speed with the irradiation light from the light source in both the first confocal scanner and the second confocal scanner, described below.

In a confocal scanner according to an embodiment, an arrangement of the plurality of first pinholes in the first pinhole array disk and an arrangement of the plurality of second pinholes in the second pinhole array disk may be identical. This configuration further facilitates design of the confocal scanner.

A confocal scanner system according to an embodiment may include:
  any of the aforementioned confocal scanners;
  a first optical system including a first confocal scanner formed by a combination of the first pinhole array disk and the condensing element array disk, the first optical system being configured to guide irradiation light through the first confocal scanner to a microscope that contains a sample and guide light to be measured based on the irradiation light from the sample to a detector, the light to be measured contributing to a first confocal image; and
  a second optical system including a second confocal scanner formed by a combination of the second pinhole array disk and the condensing element array disk, the second optical system being configured to guide the irradiation light through the second confocal scanner to the microscope and guide the light to be measured based on the irradiation light from the sample to the detector, the light to be measured contributing to a second confocal image.

This enables the pinhole diameter to be changed without requiring a complicated moving mechanism and at reduced cost. For example, in the confocal scanner, the pinhole diameter can be changed by a fixed set of disk units, without requiring a complicated moving mechanism for pinhole array disks such as those described in PTL 1. Without use of a complicated moving mechanism, the confocal scanner system enables selection of either the first confocal scanner or the second confocal scanner in the confocal scanner, thereby achieving a low-cost apparatus even when using a technique to vary the pinhole diameter. According to one embodiment, the pinhole diameter of the confocal scanner can be made variable in a microlens Nipkow disk-type confocal laser microscope. By varying the pinhole diameter in this way, the same confocality can be achieved for both a low-magnification and a high-magnification objective lens in the microscope.

In a confocal scanner system according to an embodiment, the first optical system may include a plurality of movable mirrors, and a switch may be made from the first optical system to the second optical system by each movable mirror in the plurality of movable mirrors moving to a position that does not contribute to an optical path. This enables selection of either the first confocal scanner or the second confocal scanner in the confocal scanner using only a simple moving mechanism for the movable mirrors. A low-cost apparatus can thereby be achieved even when using a technique to vary the pinhole diameter in the confocal scanner.

In a confocal scanner system according to an embodiment, the first optical system may include a first set of relay lenses connecting a pinhole surface of the first pinhole array disk and an image plane of the microscope in a conjugate relationship and a second set of relay lenses connecting a pinhole surface of the first pinhole array disk and a light-receiving surface of the detector in a conjugate relationship. This enables the proper construction of an optical system while maintaining the conjugate relationship between the pinhole surface of the first pinhole array disk, the image plane of the microscope, and the light-receiving surface of the detector.

A confocal microscope system according to an embodiment may include:
  any of the aforementioned confocal scanner systems;
  a light source configured to irradiate the irradiation light that enters the confocal scanner system;
  the microscope containing the sample irradiated by the irradiation light; and
  the detector configured to detect the light to be measured from the sample.

This enables the pinhole diameter to be changed without requiring a complicated moving mechanism and at reduced cost. For example, in the confocal scanner, the pinhole diameter can be changed by a fixed set of disk units, without requiring a complicated moving mechanism for pinhole array disks such as those described in PTL 1. Without use of a complicated moving mechanism, the confocal microscope system enables selection of either the first confocal scanner or the second confocal scanner in the confocal scanner, thereby achieving a low-cost apparatus even when using a technique to vary the pinhole diameter. According to one embodiment, the pinhole diameter of the confocal scanner can be made variable in a microlens Nipkow disk-type confocal laser microscope. By varying the pinhole diameter in this way, the same confocality can be achieved for both a low-magnification and a high-magnification objective lens in the microscope.

In a confocal microscope system according to an embodiment, the first optical system or the second optical system may be used depending on a magnification of an objective lens in the microscope. This enables achievement of the same confocality for both a low-magnification and a high-magnification objective lens in the microscope. For example, if the diameter of the first pinholes in the first pinhole array disk is ϕ50 μm, and the diameter of the second pinholes in the second pinhole array disk is ϕ25 μm, the first optical system can accommodate a high-magnification objective lens, and the second optical system can accommodate a low-magnification objective lens. This improves confocality over a wide range of magnifications, from high to low, and enables acquisition of clear images with reduced blurring.

According to the present disclosure, a confocal scanner, a confocal scanner system, and a confocal microscope system that can change the pinhole diameter without requiring a complicated moving mechanism and at reduced cost can be provided.

The background and problems with conventional technology are described in greater detail.

A typical configuration of a microlens Nipkow disk-type confocal scanner in conventional technology is now described. Such a confocal scanner has a pinhole array disk. The pinhole array disk allows signal light to pass only in the focal plane observed by the objective lens of the microscope. The confocal scanner blocks noise light outside of the focal plane. A confocal image is obtained from these pinholes.

The confocal scanner also has a microlens array disk. The microlens array disk improves the efficiency of illumination light used to illuminate the sample on the microscope. The position of each pinhole formed on the pinhole array disk and the position of each microlens formed as a condensing means on the microlens array disk are in a one-to-one relationship with each other.

The confocal scanner also has a connecting shaft that connects the pinhole array disk and the microlens array disk. The tip of the connecting shaft to which the pinhole array disk and the microlens array disk are attached is attached to a motor. The motor, together with the connecting shaft, rotates the pinhole array disk and the microlens array disk in the same direction. The confocal scanner further has a beam splitter to separate the optical path of the illumination light from the optical path of the signal light.

The function of the confocal scanner is achieved by the pinhole array disk and the microlens array disk being rotated in the same direction by the motor. In the conventional technology described above, the pinhole diameter on the pinhole array disk is one type and fixed.

A problem with the above-described microlens Nipkow disk-type confocal scanner is that the pinhole diameter is fixed. If the pinhole diameter is fixed, high confocality can be obtained only for a high-magnification objective lens or for a low-magnification objective lens. For example, if the pinhole diameter is designed to be ϕ50 μm for an objective lens with a magnification of 60× or more, confocality is high for such a high-magnification objective lens, yielding a detailed image. However, for an objective lens with a low magnification of 20× or less, for example, confocality is poor, and blurring is not sufficiently eliminated from the image. The decrease in confocality is particularly noticeable in the optical axis direction, i.e., in the depth direction of the sample.

In contrast, in the confocal optical scanner disclosed in PTL 1, two types of disk units are provided by alternately switching pinhole array disks, which have different pinhole diameters, between a position in the optical path of illumination light and a position removed from the optical path and combining each pinhole array disk with a microlens array disk. Such a confocal optical scanner achieves a microlens Nipkow disk-type confocal scanner with variable pinhole diameter.

More specifically, in the confocal optical scanner described in PTL 1, two types of disk units are placed on a linear motion mechanism, and either disk unit can be moved into the optical path. For example, when the objective lens in a microscope has a high magnification, a disk unit containing a pinhole array disk with a large pinhole diameter is used. For example, when the objective lens in a microscope has a low magnification, a disk unit containing a pinhole array disk with a small pinhole diameter is used. This yields the same confocality regardless of the magnification of the objective lens.

However, in the confocal optical scanner described in PTL 1, two types of microlens Nipkow disk-type disk units with different pinhole diameters are prepared and used respectively with the high-magnification objective lens and low-magnification objective lens. Such technology requires two types of disk units, which increases costs. The design of the moving mechanism is also complicated, since the disk unit that rotates at high speed is attached to the moving mechanism, increasing the level of difficulty. Consequently, the number of precision parts increases, further increasing costs.

A confocal scanner, a confocal scanner system, and a confocal microscope system that can solve these problems are described below. Embodiments of the present disclosure are described with reference to the drawings.

In addition to confocal laser microscopes, the present disclosure can also be applied to other products such as drug discovery support devices that use confocal laser microscopy. In a confocal laser microscope, a laser light source that can be regarded as a point light source is widened with a collimating lens or the like to form a two-dimensional surface light source, which is then used as excitation light, or irradiation light, for the confocal laser microscope. The irradiation light is irradiated onto a sample, such as cells, through a confocal optical system and a microscope optical system to excite the sample. A fluorescent substance is fused with the cells in advance, so that fluorescent light is emitted from the cells when the cells receive the excitation light. A fluorescent signal is captured as an image by the microscope optical system to observe and analyze the behavior of the cells. Such microscopy techniques can be used in a wide range of fields, from basic research in biology to applied development in drug discovery. When images of cells are captured, a confocal optical system is used to obtain high-quality images without blurring. Furthermore, a microlens Nipkow disk-type confocal laser microscope can acquire images at high speed and capture the dynamic movements of living cells in real time.

FIG. 1 is a schematic diagram illustrating an example configuration of a confocal microscope system 1 according to an embodiment. The configuration of the confocal microscope system 1 according to an embodiment is mainly described with reference to FIG. 1.

The confocal microscope system 1 has a light source 10, a confocal scanner system 20, a microscope 30, and a detector 40.

The light source 10 outputs irradiation light that enters the confocal scanner system 20 and is irradiated onto a sample S on the microscope 30. The light source 10 includes a laser light source, for example. The wavelength of the irradiation light irradiated from the light source 10 is, for example, included in the absorption band of the sample S and in the wavelength region where fluorescent light can be generated from the sample S. For example, the wavelength of the irradiation light irradiated from the light source 10 may be included in the visible region.

The confocal scanner system 20 has a confocal scanner 21, a first optical system Sa including a plurality of optical elements, and a second optical system Sb including a plurality of optical elements.

The confocal scanner 21 has a first pinhole array disk 211*a* with a plurality of first pinholes arranged in an array and a second pinhole array disk 211*b* with a plurality of second pinholes arranged in an array. In the confocal scanner 21 according to one embodiment, the diameter of the first pinholes and the diameter of the second pinholes are different from each other. For example, the diameter of the first pinholes is larger than the diameter of the second pinholes. For example, the diameter of the first pinholes may be φ50 µm, and the diameter of the second pinholes may be φ25 µm.

Figure 2:
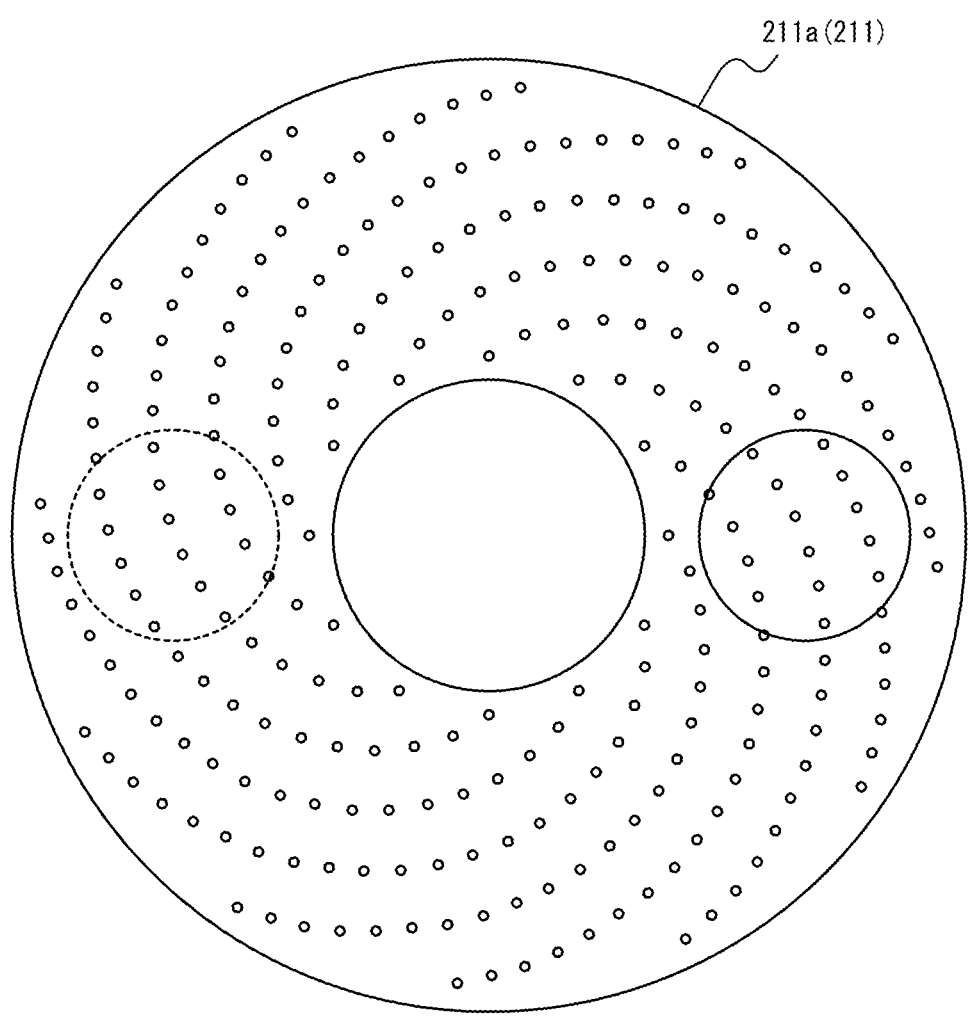
FIG. 2 is a schematic diagram of an example of a first pinhole array disk viewed from above.

FIG. 2 is a schematic diagram of an example of the first pinhole array disk 211*a* viewed from above. Although only the first pinhole array disk 211*a* is illustrated in FIG. 2, the second pinhole array disk 211*b* may be configured in the same manner as in FIG. 2. For example, the arrangement of the plurality of first pinholes in the first pinhole array disk 211*a* and the arrangement of the plurality of second pinholes in the second pinhole array disk 211*b* may be identical.

The plurality of first pinholes formed in the first pinhole array disk 211*a* are arranged at equal pitch and in a spiral in the first pinhole array disk 211*a*. Similarly, the plurality of second pinholes formed in the second pinhole array disk 211*b* are arranged at equal pitch and in a spiral in the second pinhole array disk 211*b*.

Referring again to FIG. 1, the confocal scanner 21 has a condensing element array disk 212 with a plurality of condensing elements arranged in an array. The condensing element array disk 212 is positioned to be sandwiched between the first pinhole array disk 211*a* and the second pinhole array disk 211*b*. The condensing elements include, for example, microlenses.

The confocal scanner 21 has a connecting shaft 213 that connects the first pinhole array disk 211*a*, the second pinhole array disk 211*b*, and the condensing element array disk 212, and a motor 214 that rotates the first pinhole array disk 211*a*, the second pinhole array disk 211*b*, and the condensing element array disk 212 together with the connecting shaft 213 in the same direction.

The first pinhole array disk 211*a* is attached to the connecting shaft 213 so that one first pinhole is located at a first focal plane of one condensing element in the condensing element array disk 212. The second pinhole array disk 211*b* is attached to the connecting shaft 213 so that one second pinhole is located at a second focal plane of one condensing element in the condensing element array disk 212.

More specifically, the microlens array in the condensing element array disk 212 has two focal planes in the vertical direction in FIG. 1. The first pinhole array disk 211*a* is attached at the position of the upper first focal plane. The second pinhole array disk 211*b* is attached at the position of the lower second focal plane. The position of each pinhole formed on the pinhole array disk 211, which includes the first pinhole array disk 211*a* and the second pinhole array disk 211*b*, and the position of each microlens formed as a condensing element on the condensing element array disk 212 are in a one-to-one relationship.

As described above, the confocal scanner 21 is a microlens pinhole array disk with variable pinhole diameter configured by, for example, one microlens array disk and two pinhole array disks 211, with different pinhole diameters, arranged to sandwich the microlens array disk. The combination of the first pinhole array disk 211*a* and the condensing element array disk 212 forms a first confocal scanner. Similarly, the combination of the second pinhole array disk 211*b* and the condensing element array disk 212 forms a second confocal scanner.

The confocal scanner 21 also has a first branching element 215*a* disposed between the first pinhole array disk 211*a* and the condensing element array disk 212 and a second branching element 215*b* disposed between the second pinhole array disk 211*b* and the condensing element array disk 212. A branching element 215 that includes the first branching element 215*a* and the second branching element 215*b* includes a dichroic mirror, for example.

The first optical system Sa includes the first confocal scanner, which is the combination of the first pinhole array disk 211*a* and the condensing element array disk 212. The first optical system Sa includes a plurality of movable mirrors 22*a*. For example, the first optical system Sa includes a first movable mirror 22*a*1, a second movable mirror 22*a*2, and a third movable mirror 22*a*3 arranged in this order from the light source 10 towards the detector 40. The first optical system Sa is configured by each of these three movable mirrors 22*a* moving to a position that contributes to the optical path.

The first optical system Sa includes a plurality of fixed mirrors 23*a*. For example, the first optical system Sa includes a first mirror 23*a*1, a second mirror 23*a*2, a third mirror 23*a*3, a fourth mirror 23*a*4, a fifth mirror 23*a*5, a sixth mirror 23*a*6, a seventh mirror 23*a*7, an eighth mirror 23*a*8, and a ninth mirror 23*a*9 arranged in this order from the light source 10 towards the detector 40.

The first optical system Sa includes a plurality of fixed lenses 24*a*. For example, the first optical system Sa includes a first lens 24*a*1, a second lens 24*a*2, a third lens 24*a*3, a fourth lens 24*a*4, a fifth lens 24*a*5, and a sixth lens 24*a*6 arranged in this order from the light source 10 towards the detector 40.

The first optical system Sa includes a fluorescent light filter 25*a* positioned immediately before the sixth lens 24*a*6.

The second optical system Sb includes the second confocal scanner, which is the combination of the second pinhole array disk 211*b* and the condensing element array disk 212. The second optical system Sb is configured by each of the three movable mirrors 22*a* included in the first optical system Sa moving to a position that does not contribute to the optical path.

The second optical system Sb includes a plurality of fixed mirrors 23*b*. For example, the second optical system Sb includes a first mirror 23*b*1 and a second mirror 23*b*2 arranged in this order from the light source 10 towards the detector 40.

The second optical system Sb includes a plurality of fixed lenses 24*b*. For example, the second optical system Sb includes a first lens 24*b*1 and a second lens 24*b*2 arranged in this order from the light source 10 towards the detector 40.

The second optical system Sb includes a fluorescent light filter 25*b* positioned immediately before the second lens 24*b*2.

The first optical system Sa and the second optical system Sb switch with each other by each of the movable mirrors 22*a* moving between a position that contributes to the optical path and a position that does not contribute to the optical path. At this time, the first lens 24*a*1 of the first optical system Sa and the first lens 24*b*1 of the second optical system Sb are the same lens. That is, this lens is used in common as both the first lens 24*a*1 of the first optical system Sa and the first lens 24*b*1 of the second optical system Sb. Similarly, the sixth lens 24*a*6 of the first optical system Sa and the second lens 24*b*2 of the second optical system Sb are the same lens. The fluorescent light filter 25*a* of the first optical system Sa and the fluorescent light filter 25b of the second optical system Sb are the same fluorescent light filter.

The microscope 30 includes, for example, any microscope that can be used to observe the sample S. The sample S that is irradiated with irradiation light from the light source 10 is contained in the microscope 30. The microscope 30 has an objective lens 31 that ultimately condenses the irradiation light irradiated from the light source 10 onto the sample S.

The detector 40 detects fluorescent light as light to be measured from the sample S on the microscope 30. The detector 40 includes a camera, for example. Such a camera has an appropriate photosensitivity in the wavelength band of the fluorescent light emitted from the sample S. For example, the detector 40 may have an appropriate photosensitivity in the visible region.

Figure 3:
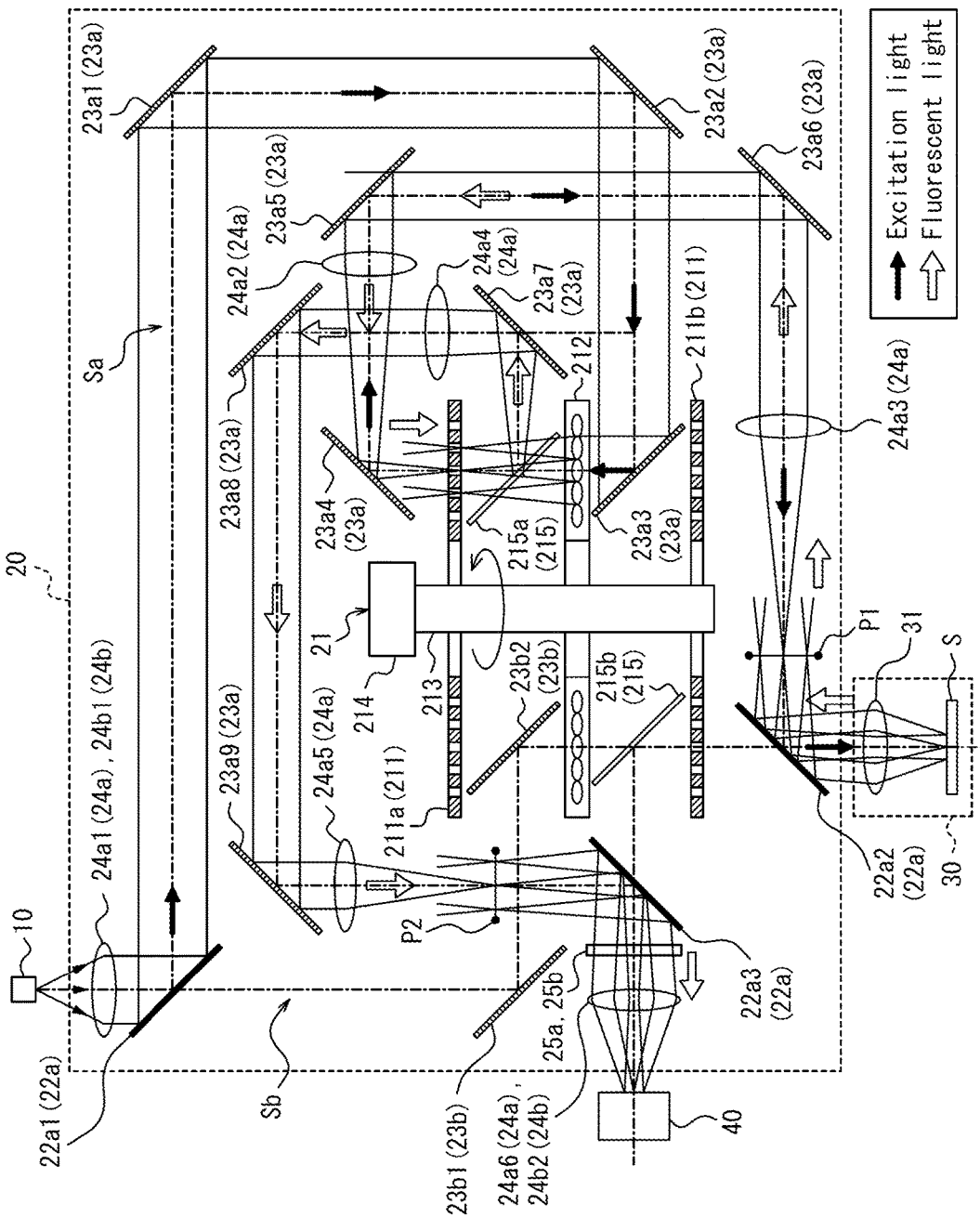
FIG. 3 is a schematic diagram, corresponding to FIG. 1, illustrating an example configuration of the confocal microscope system after switching to a first optical system.

FIG. 3 is a schematic diagram, corresponding to FIG. 1, illustrating an example configuration of the confocal microscope system 1 after switching to the first optical system Sa. The function of the confocal microscope system 1 switched to the first optical system Sa is mainly described with reference to FIG. 3. The first optical system Sa guides the irradiation light through the first confocal scanner to the microscope 30 containing the sample S and guides the light to be measured based on the irradiation light, i.e., the fluorescent light, from the sample S to the detector 40, the light to be measured contributing to a first confocal image.

The irradiation light outputted from the light source 10 while spreading is converted to parallel light by the first lens 24a1 of the first optical system Sa in the confocal scanner system 20. That is, the first lens 24a1 functions as a collimating lens. The collimated irradiation light is then reflected by the first movable mirror 22a1, the first mirror 23a1, the second mirror 23a2, and the third mirror 23a3 and is incident on the condensing element array disk 212 of the confocal scanner 21.

The irradiation light that has passed through the microlenses arranged on the condensing element array disk 212 is transmitted by the first branching element 215a and converges at the focal point of each microlens. The irradiation light converged at the focal point of each microlens passes through the first pinholes of the first pinhole array disk 211a, which is disposed at the position of the first focal plane of the microlenses. As indicated by the section enclosed by a solid line in FIG. 2, the irradiation light converged at the focal point of each microlens may, for example, be irradiated on a predetermined area of the first pinhole array disk 211a located in the 3 o'clock direction when viewed from above.

As illustrated in FIG. 3, the irradiation light, which became numerous point light sources at the first pinhole array disk 211a, is reflected by the fourth mirror 23a4, the fifth mirror 23a5, the sixth mirror 23a6, and the second movable mirror 22a2 and is incident on the microscope 30. At this time, the irradiation light, which became numerous point light sources at the first pinhole array disk 211a, is relayed to an image plane P1 of the microscope 30 by the second lens 24a2 and the third lens 24a3 in the optical path. In other words, the second lens 24a2 and the third lens 24a3 function as a set of relay lenses that connect the pinhole surface of the first pinhole array disk 211a and the image plane P1 of the microscope 30 in a conjugate relationship.

The numerous point light sources from the first pinhole array disk 211a become a point image at the sample S due to the objective lens 31 in the microscope 30 and excite the sample S. By rotation of the motor 214 of the confocal scanner 21, the numerous point light sources scan the entire surface of the sample S, making it possible to obtain two-dimensional image information.

Fluorescent light is emitted from the sample S excited by the numerous point light sources. Such fluorescent light follows a reverse optical path, yielding a fluorescent image at the image plane P1 of the microscope 30. The fluorescent light is reflected by the sixth mirror 23a6, the fifth mirror 23a5, and the fourth mirror 23a4 and is relayed to the pinhole surface of the first pinhole array disk 211a by the third lens 24a3 and the second lens 24a2 in the optical path. The fluorescent light becomes the first confocal image as a result of rotational scanning of the first pinholes.

The pinhole image of the first pinhole array disk 211a, i.e., the first confocal image, is reflected by the dichroic mirror of the first branching element 215a, which has the properties of transmitting irradiation light and reflecting fluorescent light. The first confocal image is further reflected by the seventh mirror 23a7, the eighth mirror 23a8, and the ninth mirror 23a9 and is relayed by the fourth lens 24a4 and the fifth lens 24a5 in the optical path onto a conjugate plane P2 of the image plane P1 of the microscope 30. In other words, the fourth lens 24a4 and the fifth lens 24a5 function as a set of relay lenses that connect the pinhole surface of the first pinhole array disk 211a and the conjugate plane P2 of the image plane P1 of the microscope 30 in a conjugate relationship.

The first confocal image is reflected by the third movable mirror 22a3 and is captured as an image by the camera of the detector 40 via the fluorescent light filter 25a and the sixth lens 24a6. The fourth lens 24a4, the fifth lens 24a5, and the sixth lens 24a6 function as a set of relay lenses that connect the pinhole surface of the first pinhole array disk 211a and the light-receiving surface of the detector 40 in a conjugate relationship. The fluorescent light filter 25a transmits only fluorescent light that contains information on the sample S to be observed.

Figure 4:
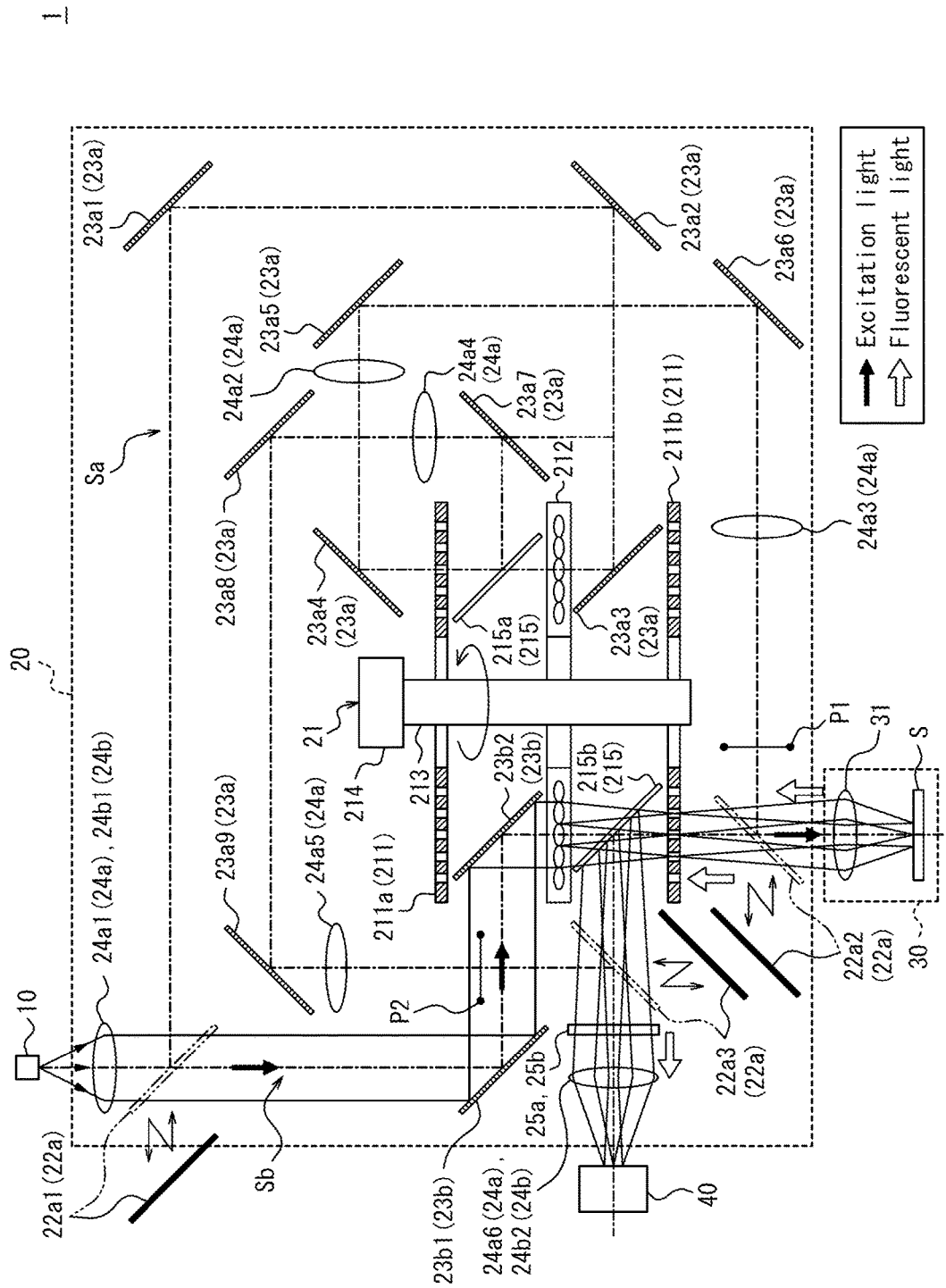
FIG. 4 is a schematic diagram, corresponding to FIG. 1, illustrating an example configuration of the confocal microscope system after switching to a second optical system.

FIG. 4 is a schematic diagram, corresponding to FIG. 1, illustrating an example configuration of the confocal microscope system 1 after switching to the second optical system Sb. The switch is made from the first optical system Sa to the second optical system Sb by each of the movable mirrors 22a moving to a position that does not contribute to the optical path. The function of the confocal microscope system 1 switched to the second optical system Sb is mainly described with reference to FIG. 4. The second optical system Sb guides the irradiation light through the second confocal scanner to the microscope 30 containing the sample S and guides the light to be measured based on the irradiation light, i.e., the fluorescent light, from the sample S to the detector 40, the light to be measured contributing to a second confocal image.

The irradiation light outputted from the light source 10 while spreading is converted to parallel light by the first lens 24b1 of the second optical system Sb in the confocal scanner system 20. That is, the first lens 24b1 functions as a collimating lens. The collimated irradiation light is then reflected by the first mirror 23b1 and the second mirror 23b2 and is incident on the condensing element array disk 212 of the confocal scanner 21.

The irradiation light that has passed through the microlenses arranged on the condensing element array disk 212 is transmitted by the second branching element 215b and converges at the focal point of each microlens. The irradiation light converged at the focal point of each microlens passes through the second pinholes of the second pinhole array disk 211b, which is disposed at the position of the second focal plane of the microlenses. As indicated by the section enclosed by a dashed line in FIG. 2, the irradiation light converged at the focal point of each microlens may, for example, be irradiated on a predetermined area of the second pinhole array disk 221b located in the 9 o'clock direction when viewed from above.

As illustrated in FIG. 4, the irradiation light, which became numerous point light sources at the second pinhole array disk 211b, becomes a point image at the sample S due to the objective lens 31 in the microscope 30 and excites the sample S. By rotation of the motor 214 of the confocal scanner 21, the numerous point light sources scan the entire surface of the sample S, making it possible to obtain two-dimensional image information.

Fluorescent light is emitted from the sample S excited by the numerous point light sources. Such fluorescent light follows a reverse optical path and is incident on the pinhole surface of the second pinhole array disk 211b. The fluorescent light becomes the second confocal image as a result of rotational scanning of the second pinholes.

The pinhole image of the second pinhole array disk 211b, i.e., the second confocal image, is reflected by the dichroic mirror of the second branching element 215b, which has the properties of transmitting irradiation light and reflecting fluorescent light. The second confocal image is captured as an image by the camera of the detector 40 via the fluorescent light filter 25b and the second lens 24b2. The fluorescent light filter 25b transmits only fluorescent light that contains information on the sample S to be observed.

As described above, the first confocal scanner and the second confocal scanner that have two different pinhole diameters are realized by a set of rotating disk units. Either the first confocal scanner or the second confocal scanner is used in conjunction with the magnification of the objective lens 31 included in the microscope 30. In other words, either the first optical system Sa or the second optical system Sb is used in conjunction with the magnification of the objective lens 31 included in the microscope 30.

Figure 5:
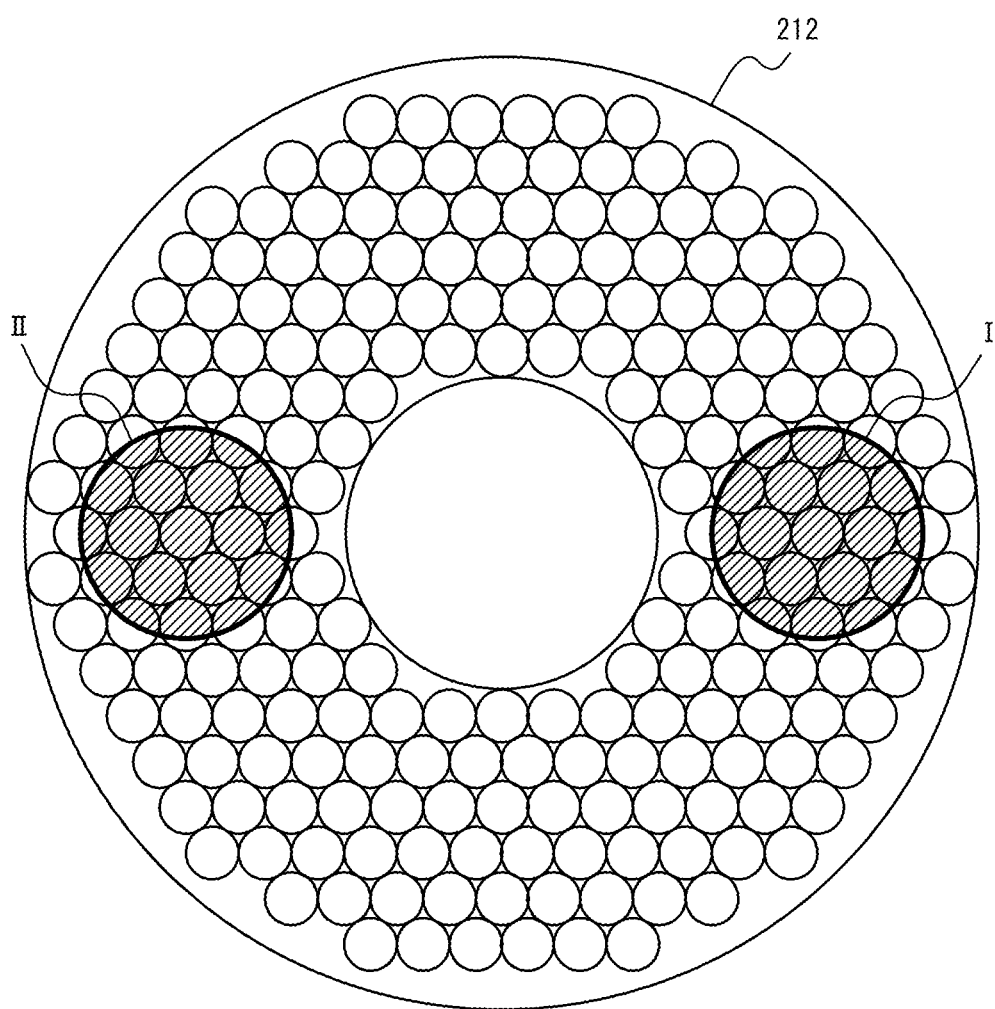
FIG. 5 is a schematic diagram of an example of a condensing element array disk viewed from above.

FIG. 5 is a schematic diagram of an example of the condensing element array disk 212 viewed from above. FIG. 5 illustrates the state of the condensing element array disk 212 when viewed from the same direction as the first pinhole array disk 211a in FIG. 2.

As illustrated in FIG. 5, numerous microlenses are arranged in an array in the condensing element array disk 212. When irradiation light is irradiated onto the condensing element array disk 212 in the first optical system Sa described above using FIG. 3, the irradiation light may be irradiated on a predetermined area of the condensing element array disk 212 located in the 3 o'clock direction when viewed from above, as indicated by the section I enclosed by a solid line in FIG. 5. On the other hand, when irradiation light is irradiated onto the condensing element array disk 212 in the second optical system Sb described above using FIG. 4, the irradiation light may be irradiated on a predetermined area of the condensing element array disk 212 located in the 9 o'clock direction when viewed from above, as indicated by the section II enclosed by a solid line in FIG. 5.

According to the embodiment described above, the pinhole diameter can be changed without requiring a complicated moving mechanism and at reduced cost. For example, in the confocal scanner 21, the pinhole diameter can be changed by a fixed set of disk units, without requiring a complicated moving mechanism for pinhole array disks such as those described in PTL 1. In the confocal scanner system 20 and the confocal microscope system 1, either the first confocal scanner or the second confocal scanner in the confocal scanner 21 can be selected using only a simple moving mechanism for the movable mirrors 22a, thereby achieving a low-cost apparatus even when using a technique to vary the pinhole diameter. According to one embodiment, the pinhole diameter of the confocal scanner 21 can be made variable in a microlens Nipkow disk-type confocal laser microscope. By varying the pinhole diameter in this way, the same confocality can be achieved for both a low-magnification and a high-magnification objective lens 31 in the microscope 30.

By including the branching element 215, the confocal scanner 21 can separate the optical path of the irradiation light coming from the light source 10 and the optical path of the fluorescent light coming from the sample S on the microscope 30. As a result of the confocal scanner 21 including the first branching element 215a and the second branching element 215b, the same effect can be achieved for both the first confocal scanner and the second confocal scanner.

The plurality of first pinholes is arranged in the first pinhole array disk 211a at equal pitch and in a spiral. The plurality of second pinholes is arranged in the second pinhole array disk 211b at equal pitch and in a spiral. With this configuration, the confocal scanner 21 can scan the sample S on the microscope 30 at high speed with the irradiation light from the light source 10 in both the first confocal scanner and the second confocal scanner.

The arrangement of the plurality of first pinholes in the first pinhole array disk 211a and the arrangement of the plurality of second pinholes in the second pinhole array disk 211b are identical, which further facilitates design of the confocal scanner 21.

In the confocal scanner system 20, the switch is made from the first optical system Sa to the second optical system Sb by each of the movable mirrors 22a moving to a position that does not contribute to the optical path. This enables selection of either the first confocal scanner or the second confocal scanner in the confocal scanner 21 using only a simple moving mechanism for the movable mirrors 22a. A low-cost apparatus can thereby be achieved even when using a technique to vary the pinhole diameter in the confocal scanner 21.

The first optical system Sa in the confocal scanner system 20 includes the second lens 24a2 and the third lens 24a3 as a first set of relay lenses. The first optical system Sa includes the fourth lens 24a4, the fifth lens 24a5, and the sixth lens 24a6 as a second set of relay lenses. This enables the proper construction of an optical system while maintaining the conjugate relationship between the pinhole surface of the first pinhole array disk 211a, the image plane P1 of the microscope 30, and the light-receiving surface of the detector 40.

By use of either the first optical system Sa or the second optical system Sb depending on the magnification of the objective lens 31 in the microscope 30, the same confocality can be achieved for both a low-magnification and a high-magnification objective lens 31 in the microscope 30. For example, if the diameter of the first pinholes in the first pinhole array disk 211a is $\phi 50$ μm, and the diameter of the second pinholes in the second pinhole array disk 211b is $\phi 25$ μm, the first optical system Sa can accommodate a high-magnification objective lens 31, and the second optical system Sb can accommodate a low-magnification objective lens 31. This improves confocality over a wide range of magnifications, from high to low, and enables acquisition of clear images with reduced blurring.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the shape, arrangement, orientation, and number of the above-described components are not limited to the above explanation or the drawings. The shape, arrangement, orientation, and number of each component may be selected freely as long as the functions of the component can be achieved.

In the above embodiment, for example, the diameter of the first pinholes has been described as being φ50 μm, and the diameter of the second pinhole as φ25 μm, but these examples are not limiting. As long as the diameter of the first pinholes and the diameter of the second pinholes are different from each other, the first pinhole array disk 211a and the second pinhole array disk 211b may be designed with any pinhole diameters. For example, the diameter of the first pinholes may be smaller than the diameter of the second pinholes.

In the above embodiment, the confocal scanner 21 has been described as including the first branching element 215a and the second branching element 215b, but this example is not limiting. The confocal scanner 21 may instead include only one of the first branching element 215a and the second branching element 215b, or both branching elements may be omitted. For example, the first branching element 215a may be disposed at any location in the first optical system Sa after the fluorescent light emitted from the sample S on the microscope 30 has passed through the first pinhole array disk 211a and the condensing element array disk 212. For example, the second branching element 215b may be disposed at any location in the second optical system Sb after the fluorescent light emitted from the sample S on the microscope 30 has passed through the second pinhole array disk 211b and the condensing element array disk 212.

In the above embodiment, the branching element 215 has been described as including a dichroic mirror, for example, but this example is not limiting. The branching element 215 may include any element that, for example, transmits the irradiation light from the light source 10 and reflects the fluorescent light from the sample S on the microscope 30. For example, the branching element 215 may include a beam splitter.

In the above embodiment, the plurality of first pinholes has been described as being arranged in the first pinhole array disk 211a at equal pitch and in a spiral, and the plurality of second pinholes as being arranged in the second pinhole array disk 211b at equal pitch and in a spiral, but this example is not limiting. The plurality of first pinholes may be arranged in the first pinhole array disk 211a in any state. The plurality of second pinholes may be arranged in the second pinhole array disk 211b in any state.

In the above embodiment, the arrangement of the plurality of first pinholes in the first pinhole array disk 211a and the arrangement of the plurality of second pinholes in the second pinhole array disk 211b have been described as being identical, but this example is not limiting. The arrangement of the plurality of first pinholes in the first pinhole array disk 211a and the arrangement of the plurality of second pinholes in the second pinhole array disk 211b may differ from each other.

In the above embodiment, the switch from the first optical system Sa to the second optical system Sb has been described as being made by each of the movable mirrors 22a moving to a position that does not contribute to the optical path, but this example is not limiting. The switch between the first optical system Sa and the second optical system Sb can be made by any simple movable element other than the movable mirrors 22a.

In the above embodiment, the first optical system Sa has been described as including a plurality of sets of relay lenses, but this example is not limiting. Instead of the first optical system Sa, the second optical system Sb may include such a plurality of sets of relay lenses. The first optical system Sa and the second optical system Sb may be configured in any way that enables clear acquisition of both the first confocal image and the second confocal image for different magnifications of the objective lens 31.

In the above embodiment, the light source 10 has been described as including a laser light source, for example, but this example is not limiting. The light source 10 may include any light source that enables acquisition of the first confocal image and the second confocal image. For example, the light source 10 may include a light emitting diode (LED). In the above embodiment, the wavelength of the irradiation light irradiated from the light source 10 has been described as being included in the visible region, but this example is not limiting. For example, the wavelength of the irradiation light irradiated from the light source 10 may be included in the ultraviolet and infrared regions or the like.

In the above embodiment, the condensing elements forming the condensing element array disk 212 have been described as including microlenses, but this example is not limiting. Such condensing elements may include any element capable of condensing the irradiation light from the light source 10 at the position of the first pinhole array disk 211a and the second pinhole array disk 211b.

In the above embodiment, as illustrated in FIGS. 2 and 5, the irradiation light or the fluorescent light has been described as being incident on a predetermined area of the first pinhole array disk 211a, the second pinhole array disk 211b, and the condensing element array disk 212 located in the 3 o'clock or the 9 o'clock direction when viewed from above, but this example is not limiting. The area on which the irradiation light or fluorescent light is incident may be arranged in any relationship between the first optical system Sa and the second optical system Sb.

The invention claimed is:

1. A confocal scanner comprising:
   a first pinhole array disk in which a plurality of first pinholes is arranged in an array;
   a second pinhole array disk in which a plurality of second pinholes is arranged in an array;
   a condensing element array disk, on which a plurality of condensing elements is arranged in an array, located between the first pinhole array disk and the second pinhole array disk;
   a connecting shaft connecting the first pinhole array disk, the second pinhole array disk, and the condensing element array disk; and
   a motor configured, together with the connecting shaft, to rotate the first pinhole array disk, the second pinhole array disk, and the condensing element array disk, wherein
   the first pinhole array disk is attached to the connecting shaft so that one first pinhole is positioned at a first focal plane of one condensing element in the condensing element array disk, the second pinhole array disk is attached to the connecting shaft so that one second pinhole is positioned at a second focal plane of one condensing element in the condensing element array disk, wherein the first focal plane is located on one side of the condensing element array disk and the second focal plane is located on an opposite side of the condensing element array disk which is opposite to the one side, the first focal plane is a focal plane of a first irradiation light which moves from the opposite side to the one side of the array disk, and the second focal plane is a focal plane of a second irradiation light which moves from the one side to the opposite side of the array disk, and a diameter of the first pinholes and a diameter of the second pinholes are different from each other.

2. The confocal scanner according to claim 1, further comprising a branching element disposed between the first pinhole array disk and the condensing element array disk and/or between the second pinhole array disk and the condensing element array disk.

3. The confocal scanner according to claim 1, wherein
the plurality of first pinholes is arranged in the first pinhole array disk at equal pitch and in a spiral, and
the plurality of second pinholes is arranged in the second pinhole array disk at equal pitch and in a spiral.

4. The confocal scanner according to claim 1, wherein an arrangement of the plurality of first pinholes in the first pinhole array disk and an arrangement of the plurality of second pinholes in the second pinhole array disk are identical.

5. A confocal scanner system comprising:
the confocal scanner according to claim 1;
a first optical system comprising a first confocal scanner formed by a combination of the first pinhole array disk and the condensing element array disk, the first optical system being configured to guide the first irradiation light through the first confocal scanner to a microscope that contains a sample and guide first light to be measured based on the first irradiation light from the sample to a detector, the first light to be measured contributing to a first confocal image; and
a second optical system comprising a second confocal scanner formed by a combination of the second pinhole array disk and the condensing element array disk, the second optical system being configured to guide the second irradiation light through the second confocal scanner to the microscope and guide second light to be measured based on the second irradiation light from the sample to the detector, the second light to be measured contributing to a second confocal image.

6. The confocal scanner system according to claim 5, wherein
the first optical system includes a plurality of movable mirrors, and
a switch is made from the first optical system to the second optical system by each movable mirror in the plurality of movable mirrors moving to a position that does not contribute to an optical path.

7. The confocal scanner system according to claim 5, wherein the first optical system comprises a first set of relay lenses connecting a pinhole surface of the first pinhole array disk and an image plane of the microscope in a conjugate relationship and a second set of relay lenses connecting a pinhole surface of the first pinhole array disk and a light-receiving surface of the detector in a conjugate relationship.

8. A confocal microscope system comprising:
the confocal scanner system according to claim 5;
a light source configured to irradiate the irradiation light that enters the confocal scanner system;
the microscope containing the sample irradiated by the irradiation light; and
the detector configured to detect the light to be measured from the sample.

9. The confocal microscope system according to claim 8, wherein the first optical system or the second optical system is used depending on a magnification of an objective lens in the microscope.

* * * * *